United States Patent
Walter et al.

(10) Patent No.: US 10,725,936 B2
(45) Date of Patent: Jul. 28, 2020

(54) DATA PROCESSING SYSTEM AND METHOD FOR PROTECTING DATA IN A DATA MEMORY AGAINST AN UNDETECTED CHANGE

(71) Applicant: Siemens Aktiengesellschaft, Munich (DE)

(72) Inventors: Maximilian Walter, Nuremberg (DE); Karl-Hermann Witte, Fuerth (DE)

(73) Assignee: Siemens Aktiengesellschaft, Munich (DE)

( * ) Notice: Subject to any disclaimer, the term of this patent is extended or adjusted under 35 U.S.C. 154(b) by 143 days.

(21) Appl. No.: 16/048,659

(22) Filed: Jul. 30, 2018

(65) Prior Publication Data
US 2019/0073320 A1 Mar. 7, 2019

(30) Foreign Application Priority Data
Aug. 7, 2017 (EP) .................................... 17185083

(51) Int. Cl.
*G06F 12/14* (2006.01)
*H03M 7/30* (2006.01)
*H03M 7/40* (2006.01)
*H03M 7/02* (2006.01)
*G06F 21/62* (2013.01)

(52) U.S. Cl.
CPC ...... *G06F 12/1458* (2013.01); *G06F 21/6218* (2013.01); *H03M 7/02* (2013.01); *H03M 7/4006* (2013.01); *H03M 7/6041* (2013.01); *G06F 2212/1052* (2013.01)

(58) Field of Classification Search
CPC ........ G06F 2212/1052; H03M 7/4006; H03M 7/02
See application file for complete search history.

(56) References Cited

U.S. PATENT DOCUMENTS

| | | | | |
|---|---|---|---|---|
| 5,974,350 | A * | 10/1999 | Davis, Jr. ................ | G06N 7/04 701/36 |
| 9,460,168 | B1 * | 10/2016 | Sinclair .................. | G06F 9/542 |
| 2008/0068588 | A1 * | 3/2008 | Hess .................. | G01N 21/6458 356/36 |
| 2009/0055828 | A1 * | 2/2009 | McLaren ............... | G06Q 10/06 718/103 |
| 2010/0211201 | A1 * | 8/2010 | Papenfort .......... | G05B 19/0421 700/95 |

(Continued)

FOREIGN PATENT DOCUMENTS

| | | | |
|---|---|---|---|
| CN | 1904876 A | * | 1/2007 |
| EP | 3104276 | | 6/2015 |

OTHER PUBLICATIONS

Zheng et al, Hardware Error Detection Using AN-Codes, 1980, pp. 10-250 (Year: 1980).*

(Continued)

*Primary Examiner* — Ali Shayanfar
(74) *Attorney, Agent, or Firm* — Cozen O'Connor

(57) ABSTRACT

A method for protecting data in a data memory against an undetected change, wherein a functional variable x is encoded via a value, an input constant, an input signature and a timestamp D into a coded variable, where the functional variable is normalized relative to a base to form the integer value from the functional variable.

8 Claims, 2 Drawing Sheets

(56) References Cited

U.S. PATENT DOCUMENTS

| | | | | |
|---|---|---|---|---|
| 2013/0262938 A1* | 10/2013 | Schmitt | ............... | G06F 11/085 |
| | | | | 714/48 |
| 2014/0019823 A1* | 1/2014 | Ramirez | ............. | G06F 11/1064 |
| | | | | 714/755 |
| 2015/0199530 A1* | 7/2015 | Thanos | ................. | G01D 4/002 |
| | | | | 713/164 |
| 2015/0220405 A1* | 8/2015 | Neef | .................. | G06F 11/1438 |
| | | | | 714/15 |
| 2015/0220457 A1* | 8/2015 | Katoh | ..................... | G09C 1/00 |
| | | | | 713/193 |
| 2016/0241981 A1* | 8/2016 | Law | ..................... | G10L 19/018 |
| 2017/0093439 A1* | 3/2017 | Motwani | .............. | H03M 13/45 |
| 2019/0027082 A1* | 1/2019 | Van Belle | ............ | G09G 3/2003 |

OTHER PUBLICATIONS

Schiffel Ute: "Hardware Error Detection Using AN-Codes", XP055448091, Dresden, Germany Gefunden im Internet: URL:https://d-nb.info/1067189289/34; 2011.

* cited by examiner

DATA PROCESSING SYSTEM AND METHOD FOR PROTECTING DATA IN A DATA MEMORY AGAINST AN UNDETECTED CHANGE

BACKGROUND OF THE INVENTION

1. Field of the Invention

The invention relates to a data processing system and a method for protecting the data stored in a data memory against an undetected change.

2. Description of the Related Art

In safety-related applications, it is common practice to use variables in coded form so that they can be protected against errors and undetected modification. During an arithmetic coding process, a functional variable x is expanded by different check bits that enable specific errors that have occurred to be detected. An extended form of arithmetic coding is the ANBD encoding scheme. In ANBD encoding, an uncoded functional variable x is converted via an input constant A, a variable-specific input signature $B_x$ and a timestamp D into a coded variable $x_c$.

$$x_c = A*x + B_x + D \qquad \text{Eq. 1}$$

The input constant A enables errors in the value range to be detected. The use of a variable-specific input signature $B_x$ enables operand and operator errors to be detected. The use of a timestamp D enables an unperformed update of the variable to be detected.

In the application, the coded variable $x_c$ is used throughout in this case, because a decoding of the variable into the uncoded form x would lead to the loss of the error information present in the coded variable $x_c$. In order to perform computational operations with a coded variable $x_c$, it is necessary to use coded operators that include not only the functional part x, but also the associated check bits in the operation.

EP 3 104 276 A1 describes a method that enables an AND-encoded variable $x_c$ to be recoded into an A'NB'D'-encoded variable $x_c'$, i.e., the check bits A, B and D to be replaced by the check bits A', B' and D', without at the same time decoding the coded variable in one of the intermediate steps.

A disadvantageous aspect of ANBD encoding is that realizing floating-point arithmetic in this encoding scheme is very complicated and time-consuming. Thus, in accordance with the present state of the art, floating-point numbers (also known, inter alia, as reals or floats) are not processed explicitly as a data type in purely software-based safety-related applications. In accordance with the present state of the art, a particular solution approach in integer arithmetic (also known, inter alia, as integers) must be found for each requirement. In safety-related applications, it should be noted in this regard that it is not the mean but the maximum error of a calculation that is relevant. For this reason, the property of floating-point arithmetic, i.e., a value is always calculated with maximum precision, is not relevant in safety-related applications, but leads in ANBD-encoded processing of the data type to a computing time that is orders of magnitude longer than the computing time elapsing in the case of uncoded processing. Using a fixed-point arithmetic is not an alternative, because it does not allow the desired precision, in particular for more complex processing operations.

SUMMARY OF THE INVENTION

It is therefore an object of the invention to provide a representation of the data that allows a comparable application flexibility to floating-point arithmetic but requires fewer computing steps.

This and other objects and advantages are achieved in accordance with the invention by a method for protecting data in a data memory against an undetected change. A modification of the data can therefore be detected via the method. In this case, a functional variable x is encoded via a value $value_x$, an input constant A, an input signature $B_x$ and a timestamp D into a coded variable $x_c$ in accordance with the following relationship:

$$x_c := value_x * A + B_x + D. \qquad \text{Eq. 2}$$

The method is characterized in that the functional variable x is normalized relative to a base $Base_x$ to form the integer value $value_x$ from the functional variable x. In other words, a functional variable x is converted into an ANBD-encoded variable $x_c$, where the functional variable is normalized to a base $Base_x$. This means that the functional variable x is represented within the coded variable $x_c$ as $value_x$, which is an integer multiple of the base $Base_x$. The base $Base_x$ is therefore the unit in which the functional variable x is represented. Accordingly, a functional variable x present as a floating-point number is reproduced in the coded variable as a functional component via an integer $value_x$. The advantage resulting from this is that operations relating to the functional variable x may be performed in integer arithmetic. In this way, the maximum error in operations and the required computational overhead are reduced in comparison with floating-point arithmetic. At the same time, the flexibility is not limited with respect to the value range compared to the floating-point representation. The calculations are therefore performed with a higher degree of precision in the intermediate results and a subsequent rounding. As a result of the method, the duration of a coded processing operation is increased by a factor compared to uncoded processing. This factor lies significantly below the several orders of magnitude by which the duration increases when using coded floating-point numbers compared to uncoded processing.

In an embodiment of the method, the functional variable x is encoded during a compilation operation to yield the coded variable $x_c$. In other words, the functional variable x is encoded during the binary number generation, for example in the compiler, into the coded variable $x_c$. The encoding and in particular the normalization to a fixed base are therefore already performed at the time of the code generation. The advantage resulting from this is that the computing time can be reduced during the execution of the program because it is no longer necessary to establish a base during the runtime of a program.

In an embodiment, the value $value_x$ is calculated in accordance with the following relationship:

$$value_x := (x/Base_x) \bmod (2)^{Size_x}. \qquad \text{Eq. 3}$$

In other words, the functional variable x is divided by the base $Base_x$, where a remainder of the division is discarded. $Size_x$ is the number of possible states or the available memory. This may be specified by the available number of bits n for storing a single value, that is to say, be equal, e.g., to a value $2^n = 2^{16}$ where n=16 bits. The advantage resulting from this is that the value $value_x$ is present as an integer. It is therefore possible to convert a floating-point number into an integer.

In another embodiment of the invention, the value $\text{value}_x$ is formed by subtracting a smallest attainable value $\min_x$ of the functional variable x, which smallest attainable value is predefined according to a control program, from the functional variable x before the smallest attainable value is divided by the base $\text{Base}_x$, the remainder being discarded, i.e., $$\text{value}_x := (x - \min_x / \text{Base}_x) \bmod (2)^{Size_x} \qquad \text{Eq. 4}$$

The value $\min_x$ may be determined in uncoded form in a test run of the control program.

This results in the advantage that the value range is limited to the predefined value range.

In another embodiment, the data is provided for a control program and the base $\text{Base}_x$ is calculated to a value greater than or equal to the difference between a greatest attainable value $\max_x$ predefined in accordance with the control program for the value x and a smallest attainable value $\min_x$ of the value x, divided by the size of the available memory, i.e., $$\text{Base}_x \geq (\max_x - \min_x) / \text{Size}_x \qquad \text{Eq. 5}$$

In other words, the base $\text{Base}_x$ represents the smallest possible unit into which the attainable value range can be subdivided. Two advantages are produced as a result of this step: Because the base is determined relative to the entire attainable value range, an overflow of values is excluded. Put differently, a value is prevented from exceeding the maximum value and consequently being unable to be represented. Because the base assumes the smallest possible value, the greatest possible precision is provided. In other words, the computational inaccuracy due to an overly, roughly chosen base is minimized. Overall, this development leads to the base assuming the smallest possible value that is possible without the risk of an overflow. The precise value of the base $\text{Base}_x$ may be specified according to this criterion.

In an embodiment of the method, a coded addition $+_c$ of two coded variables $x_{1c}$ and $x_{2c}$ is performed in accordance with the following relationship:

$$x_{3c} := x_{1c} +_c x_{2c}, \text{ where:} \qquad \text{Eq. 6}$$

$$\text{value}_{x3} := (\text{value}_{x1} * k_1 + \text{value}_{x2} * k_2 + k_3) / \text{Size}_{x3},$$

where the following applies:

$$\max_{x3} = \max_{x1} + \max_{x2}$$

$$\min_{x3} = \min_{x1} + \min_{x2}$$

$$\text{Base}_{x1} \geq (\max_{x1} - \min_{x1}) / \text{Size}_{x1}$$

$$\text{Base}_{x2} (\max_{x2} - \min_{x2}) / \text{Size}_{x2}$$

$$\text{Base}_{x3} (\max_{x3} - \min_{x3}) / \text{Size}_{x3}$$

$$k_2 / k_1 \text{Base}_{x1} / \text{Base}_{x2}$$

$$k_1 + \text{Base}_{x1} / 2^n \approx \text{Base}_{x3}$$

$$k_2 + \text{Base}_{x2} / 2^n \approx \text{Base}_{x3}$$

and $\approx$ means that due to rounding errors and processor inaccuracy there is no requirement for any mathematical equality to be present, yet the specified calculation is to be implemented.

In other words, the coded operator $+_c$ relating to the addition is defined via the above-cited relationship. Here, calculations in the compiled program are performed only with the values $\text{value}_{x1}$, $\text{value}_{x2}$ and $\text{value}_{x3}$. The constants $k_1$ and $k_2$ in this case describe the relations between the bases $\text{Base}_{x1}$, $\text{Base}_{x2}$ and $\text{Base}_{x3}$. The base $\text{Base}_{x1}$ is the base of the variable $x_1$, the base $\text{Base}_{x2}$ is the base of the variable $x_2$, and the base $\text{Base}_{x3}$ is the base of the result $x_3$. The greatest values $\max_{x1}$ and $\max_{x2}$ predefined in accordance with the control program, as well as the smallest values $\min_{x1}$ and $\min_{x2}$ predefined in accordance with the control program for the variables $x_1$ and $x_2$, are used to form the bases $\text{Base}_{x1}$ and $\text{Base}_{x2}$. The smallest and the greatest value for $x_3$ are formed by means of an addition of the greatest and smallest values, respectively, of the variables $x_1$ and $x_2$. The constant $k_3$ may be chosen so as to minimize rounding errors. The bases may be determined via a compiler. The advantage resulting from this is that no base needs to be determined during the runtime of the addition operation. Furthermore, only integers are used during the operation. Separate operations relating to the mantissa and the exponent, as is necessary in the addition of floating-point numbers, and the transformations and normalizations required for this, are therefore unnecessary.

In an embodiment, a coded multiplication $*_c$ of two coded variables $x_{1c}$ and $x_{2c}$ is performed in accordance with the following relationship:

$$x_{3c} := x_{1c} *_c x_{2c}, \text{ where} \qquad \text{Eq. 7}$$

$$\text{value}_{x3} := (\text{value}_{x1} * \text{value}_{x2} + k) / \text{Size}_{x3},$$

where the following applies:

$$\text{Base}_{x1} \geq (\max_{x1} - \min_{x1}) / \text{Size}_{x1}$$

$$\text{Base}_{x2} \geq (\max_{x2} - \min_{x2}) / \text{Size}_{x2}$$

$$\text{Base}_{x3} \geq (\max_{x3} - \min_{x3}) / \text{Size}_{x3}$$

$$\text{Base}_{x3} \approx (\text{Base}_{x1} * \text{Base}_{x2}) / \text{Size}_{x3}$$

$$\max_{x3} = \text{MAX}(\min_{x1} * \min_{x2}, \min_{x1} * \max_{x2}, \max_{x1} * \min_{x2}, \max_{x1} * \max_{x2})$$

$$\min_{x3} = \text{MIN}(\min_{x1} * \min_{x2}, \min_{x1} * \max_{x2}, \max_{x1} * \min_{x2}, \max_{x1} * \max_{x2}).$$

In other words, a multiplication of the coded variables $x_{1c}$ and $x_{2c}$ is performed via the values $\text{value}_{x1}$ and $\text{value}_{x2}$. The greatest and smallest product yielded in each case in a multiplication of the greatest possible values $\max_{x1}$, $\max_{x2}$ and the smallest possible values $\min_{x1}$, $\min_{x2}$ of $x_1$ and $x_2$, respectively, are used as the greatest possible value $\max_{x3}$ and as the smallest possible value $\min_{x3}$, respectively, of the variable $x_3$.

In a further embodiment, a value $\text{value}_{x1}$ having a base $\text{Base}_{x1}$ is recoded to a value $\text{value}'_{x1}$ having a base $\text{Base}'_{x1}$ in accordance with the following relationship:

$$\text{value}'_{x1} = (((\text{value}_{x1} + k_1) / 2^n) * k_2 + k_3) / 2^{n'}, \qquad \text{Eq. 8}$$

where $$k_2 / (2^n + n') \approx \text{Base}_x / \text{Base}'_x$$

and n' is the bit count of the recoded representation.

In this case, the constants $k_1$, $k_2$ and $k_3$ are chosen so as to minimize the rounding error as a function of $k_2$.

It is also an object of the invention to provide a data processing system that is configured to perform one of the above-cited methods. In this context, the system may be a microcontroller or a microprocessor, for example.

Other objects and features of the present invention will become apparent from the following detailed description considered in conjunction with the accompanying drawings.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is described below, in which.

DETAILED DESCRIPTION OF THE EXEMPLARY EMBODIMENTS

The sine value of a functional variable x in degrees may be calculated numerically in a range of 0° inclusive up to and including 45° by means of the following function:

```
static float sin7pi4(float x){
    float a = 9.99999989793669848536e-1;
    float b = -1.66666423796176028737e-1;
    float c = 8.33179571459221545387e-3;
    float d = -1.94842039748219288187e-4;
    float square = x*x;
    float tmp1 = square*d;
    float tmp2 = c + tmp1;
    float tmp3 = square*tmp2;
    float tmp4 = (b + tmp3);
    float tmp5 = square*tmp4;
    float tmp6 = (a + tmp5);
    float tmp7 = tmp6*x;
    return tmp7;
}
```

The function concerns a power series using the constants a, b, c and d. Intermediate steps may be combined here under tmp1-tmp7. The power series may be concluded with tmp7, which can be output at the end of a program (return tmp7). The value square may be the square of the functional variable x. All of the values may be a floating-point number (float).

The above-cited function may be performed in coded form via the method in accordance with the invention. Here, a bit count n of e.g. 49 bits may be made available. The precision of the input may be specified to a thousandth, for example.

Figure 1:
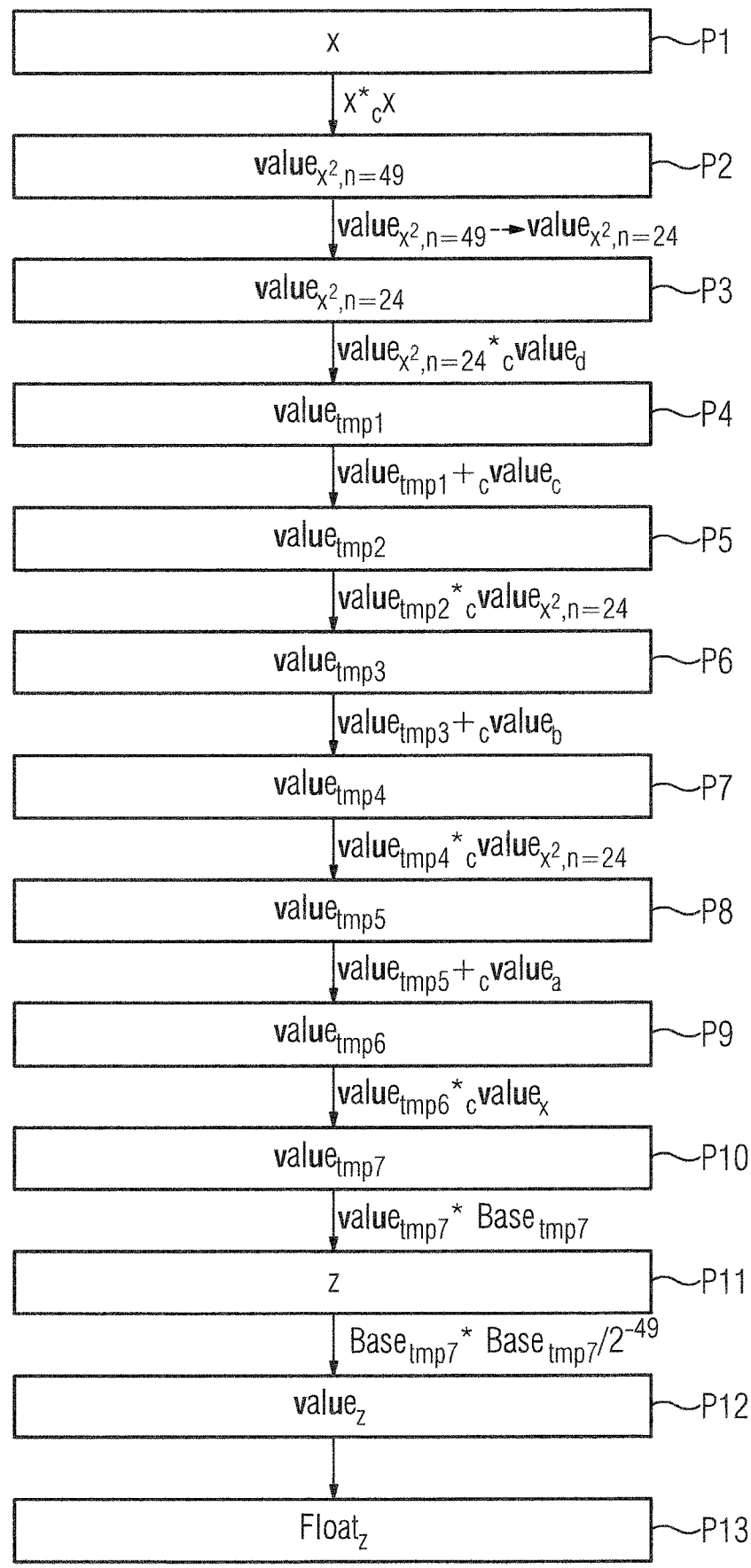
FIG. 1 illustrates the execution flow of a coded calculation of a sine value using the described method.

With reference to FIG. 1, in a first step P1, the size $Size_x$ is calculated. According to the limits of the control program, which may range from 0° inclusive up to and including 45°, a smallest possible value $min_x=0$ and a greatest possible value $max_x=45000$ may be specified in the case of a precision fixed at $1/1000°$. The input value is therefore present as an integer. According to the above definitions, this yields:
$Size_x:=2^{49}$
$min_x:=0$
$max_x:=45000$ In a second step P2, the square of x is calculated, where a bit count of n=49 bits can be available. The base for calculating a square of x given a bit count of n=49, $Base_{x^2,n=49}$, can be calculated from the smallest possible value $min_{x^2,n=49}$ and the greatest possible value $max_{x^2,n=49}$ of the square.

$max_{x^2,n=49}:=max_x*max_x$ $min_{x^2,n=49}:=min_x*min_x$ $Base_{x^2,n=49}:=(max_x^2-min_x^2)/Size_{x^2,n=49}$ $value_{x^2,n=49}:=value_x*value_x/Base_{x^2,n=49}$ $=value_x*value_x*277999$.

In a third step P3, the value $value_{x^2,n=49}$ is recoded from the base $Base_{x^2,n=49}$ to a base $Base_{x^2,n=24}$, which can have a bit count of 24 bits:

$value_{x^2,n=24}=(value_{x^2,n=49}+2^{24})/2^{25}$.

In a fourth step P4, the temporary value $value_{tmp1}$ is calculated:

$value_{tmp1}:=(value_{x^2,n=49}*value_{d,n=49}+k)/2^{24}$

In a fifth step P5, the temporary value $value_{tmp2}$ is calculated:

$value_{tmp2}:=(value_{c,n=49}*k_1+value_{tmp1,n=49}*k_2+k)/2^{24}$

In a sixth step P6, the temporary value $value_{tmp3}$ is calculated:

$value_{tmp3}:=(value_{x^2,n=24}*value_{tmp2,n=24}+k)/2^{24}$

In a seventh step P7, the temporary value $value_{tmp4}$ is calculated:

$value_{tmp4}:=(value_{b,n=24}*k_1+value_{tmp3,n=24}*k_2+k)/2^{24}$

In an eighth step P8, the temporary value $value_{tmp5}$ is calculated:

$value_{tmp5}:=(value_{x2,n=24}*value_{tmp4,n=24}+k)/2^{24}$

In a ninth step P9, the temporary value $value_{tmp6}$ is calculated:

$value_{tmp6}:=(value_{a,n=24}*k_1+value_{tmp5,n=24}*k_2+k)/2^{24}$

In a tenth step P10, the temporary value $value_{tmp7}$ is calculated:

$value_{tmp7}:=(value_{x,n=24}*value_{tmp6,n=24}+k)/2^{24}$

In an eleventh step P11, the value z is calculated from the temporary value $value_{tmp7}$ and its base $Base_{tmp7}$:

$z:=\sin(x):=value_{tmp7,n=24}*Base_{tmp7}$

In a twelfth step P12, the value $value_z$ having a base $2^{-49}$ specified for a return value is calculated from the temporary value $value_{tmp7}$ and its base $Base_{tmp7}$:

$value_z:=Base_{tmp7}*Base_{tmp7}/2^{-49}$

In a thirteenth step P13, the value $value_z$ is converted into a floating-point number $Float_z$. This is advantageous owing to the fact that the base of the value $value_z$ is a 2nd power.

A program code could be written in the following manner, for example:
Size:=$2^{49}$
Minimum:=0
Maximum:=45000

$square_{val49}:=277999*X_{val}*X_{val}$ $square_{val24}:=(square_{val49}+2^{24})/2^{25}$ $tmp2_{val}:=18172496+(-1378477226-squareval49)/2^{31}$ $tmp4_{val}:=(square_{val24}*tmp2_{val}+111040616)/2-18415894$ $tmp6_{val}:=(square_{val124}*tmp4_{val}-197673)/2^{18}+11464190094$ $$tmp7_{val} := (tmp6_{val} * x_{val} + 2^{22})/2^{23}$$

$$tmp7_{bas} := 1.277097000028899636e-8$$

$$z := \text{SIN}(x) := tmp7_{val} * 1.277097000028899636e-8$$

Desired base for z: $2^{-49}$ $$Z_{val} := tmp7_{bas} * 7189417$$

Overall, the example demonstrates how, via the invention, a representation of data is provided that allows a flexible and efficient processing of ANBD-encoded data.

Figure 2:
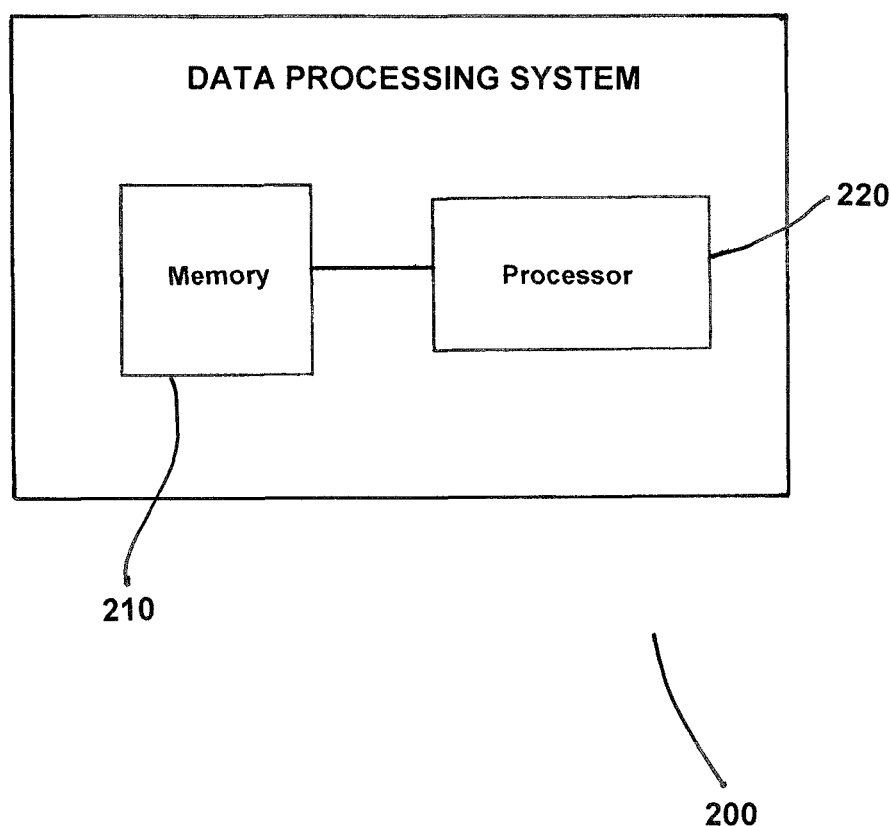
FIG. 2 is a schematic block diagram of a data processing system in accordance with the invention.

FIG. 2 is schematic block diagram of a data processing system 200 in accordance with the invention. Here, the system may comprise memory 210 and a processor 220, such as a microcontroller or a microprocessor, which is configured to implement the method in accordance with the invention.

What is claimed is:

1. A method for protecting data in a data memory against an undetected change, comprising:

encoding a functional variable x via a value $value_x$, an input constant A, an input signature $B_x$ and a timestamp D into a coded variable $x_c$ in accordance with the relationship:

$$x_c := value_x * A + B_x + D; \text{ and}$$

normalizing the functional variable x relative to a base $Base_x$ to form the integer value $value_x$ from said functional variable x to protect the data in the data memory against the undetected change;

wherein the value $value_x$ is calculated in accordance with the following relationship:

$$value_x := (x/Base_x) \bmod 2^{Sizex},$$

where Sizex is a size of an available memory.

2. The method as claimed in claim 1, wherein the functional variable x is encoded during a compilation operation to yield the coded variable $x_c$.

3. The method as claimed in claim 1, wherein the data is provided for a control program and the base $Base_x$ is set to a value greater than or equal to a difference between a greatest attainable value $max_x$ predefined according to the control program for the value x and a smallest attainable value $min_x$ predefined according to the control program, divided by the size of the available memory $Size_x$, such that $Base_x \geq (max_x - min_x)/Size_x$.

4. The method as claimed in claim 1, wherein a coded addition $+_c$ of two coded variables $x_{1c}$ and $x_{2c}$ is performed in accordance with the relationship:

$$value_{x3} := (value_{x1} * k_1 + value_{x2} * k_2 + k_3)/Size_{x3},$$

where
$Base_{x3} \geq (max_{x3} - min_{x3})/Size_{x3}$
$max_{x3} = max_{x1} + max_{x2}$
$min_{x3} = min_{x1} + min_{x2}$
$k_2/k_1 \approx Base_{x1}/Base_{x2}$
$k_1 + Base_{x1}/2^n \approx Base_{x3}$
$k_2 + Base_{x2}/2^n \approx Base_{x3}$.

5. The method as claimed in claim 1, wherein a coded multiplication $*_c$ of two coded variables $x_{1c}$ and $x_{2c}$ is performed in accordance with the relationship:

$$value_{x3} := (value_{x1} * value_{x2} + k)/2^n,$$

where
$Base_{x3} \geq (max_{x3} - min_{x3})/Size_{x3}$
$Base_{x3} \approx (Base_{x1} * Base_{x2})/Size_{x3}$
$max_{x3} = \text{MAX}(min_{x1} * min_{x2}, min_{x1} * max_{x2}, max_{x1} * min_{x2}, max_{x1} * max_{x2})$
$min_{x3} = \text{MIN}(min_{x1} * min_{x2}, min_{x1} * max_{x2}, max_{x1} * min_{x2}, max_{x1} * max_{x2})$
$k_2/k_1 \approx Base_{x1}/Base_{x2}$
$k_1 + Base_{x1}/2^n \approx Base_{x3}$
$k_2 + Base_{x2}/2^n \approx Base_{x3}$.

6. The method as claimed in claim 1, wherein a recoding from a $Base_x$ to a base $Base'_x$ is performed in accordance with the following relationship:

$$value'_{x1} = (((value_{x1} + k_1)/2^n) * k_2 + k_3)/2^m,$$

where $k_2/(2n+n') \approx Base_x/Base'_x$.

7. A data processing system comprising:
a processor; and
data memory:
wherein the processor is configured to:
encode a functional variable x via a value $value_x$, an input constant A, an input signature $B_x$ and a timestamp D into a coded variable $x_c$ in accordance with the relationship:

$$x_c := value_x * A + B_x + D; \text{ and}$$

normalize the functional variable x relative to a base $Base_x$ to form the integer value $value_x$ from said functional variable x to protect the data in the data memory against the undetected change;

wherein the value $value_x$ is calculated in accordance with the following relationship:

$$value_x := (x/Base_x) \bmod 2^{Sizex},$$

where Sizex is a size of an available memory.

8. A method for protecting data in a data memory against an undetected change, comprising:

encoding a functional variable x via a value $value_x$, an input constant A, an input signature $B_x$ and a timestamp D into a coded variable $x_c$ in accordance with the relationship:

$$x_c := value_x * A + B_x + D; \text{ and}$$

normalizing the functional variable x relative to a base $Base_x$ to form the integer value $value_x$ from said functional variable x to protect the data in the data memory against the undetected change;

wherein the value $value_x$ is calculated in accordance with the following relationship:

$$value_x := (x - min_x/Base_x) \bmod 2^{Sizex},$$

where $min_x$ is a predefined minimum value of x.

* * * * *